UNITED STATES PATENT OFFICE.

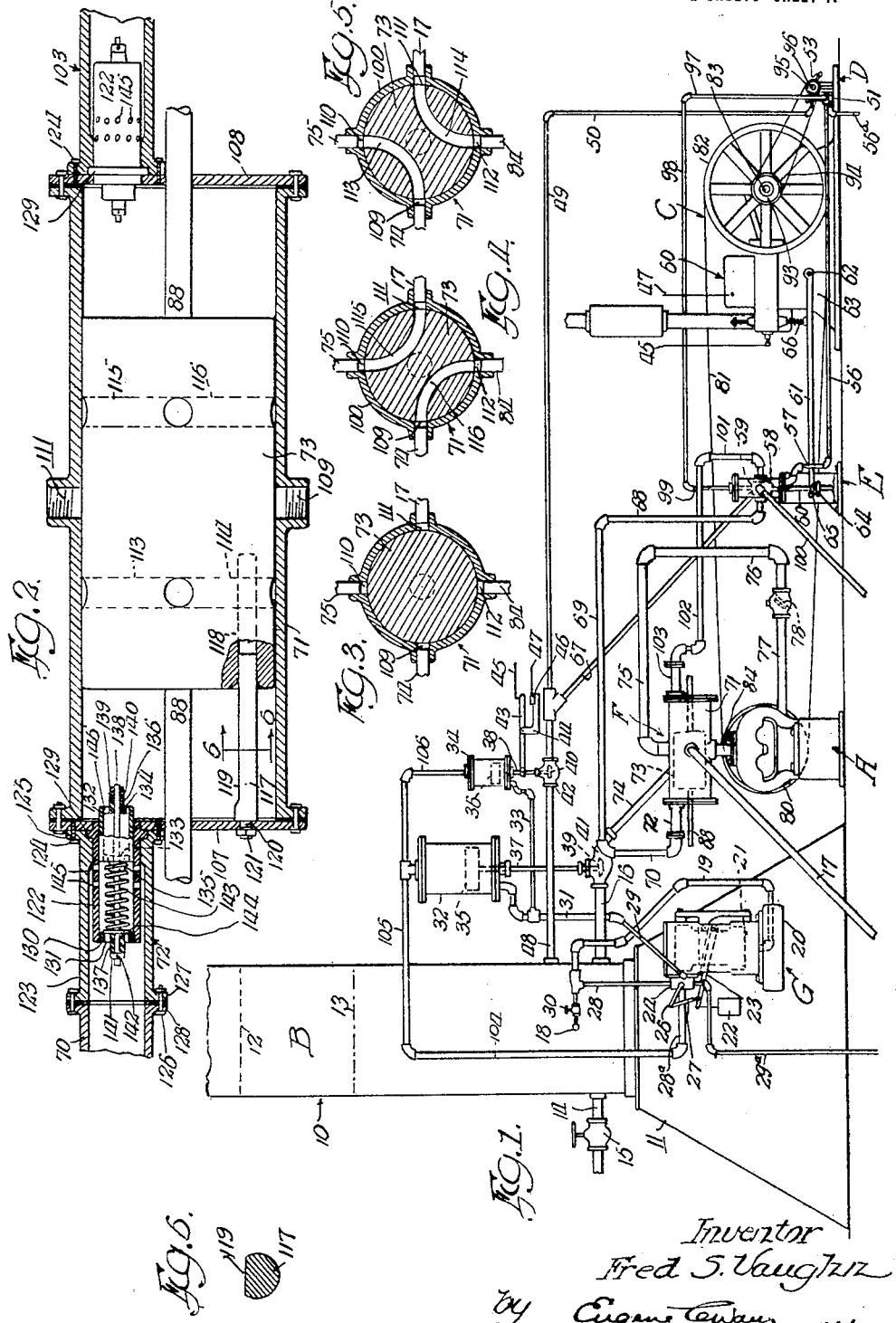

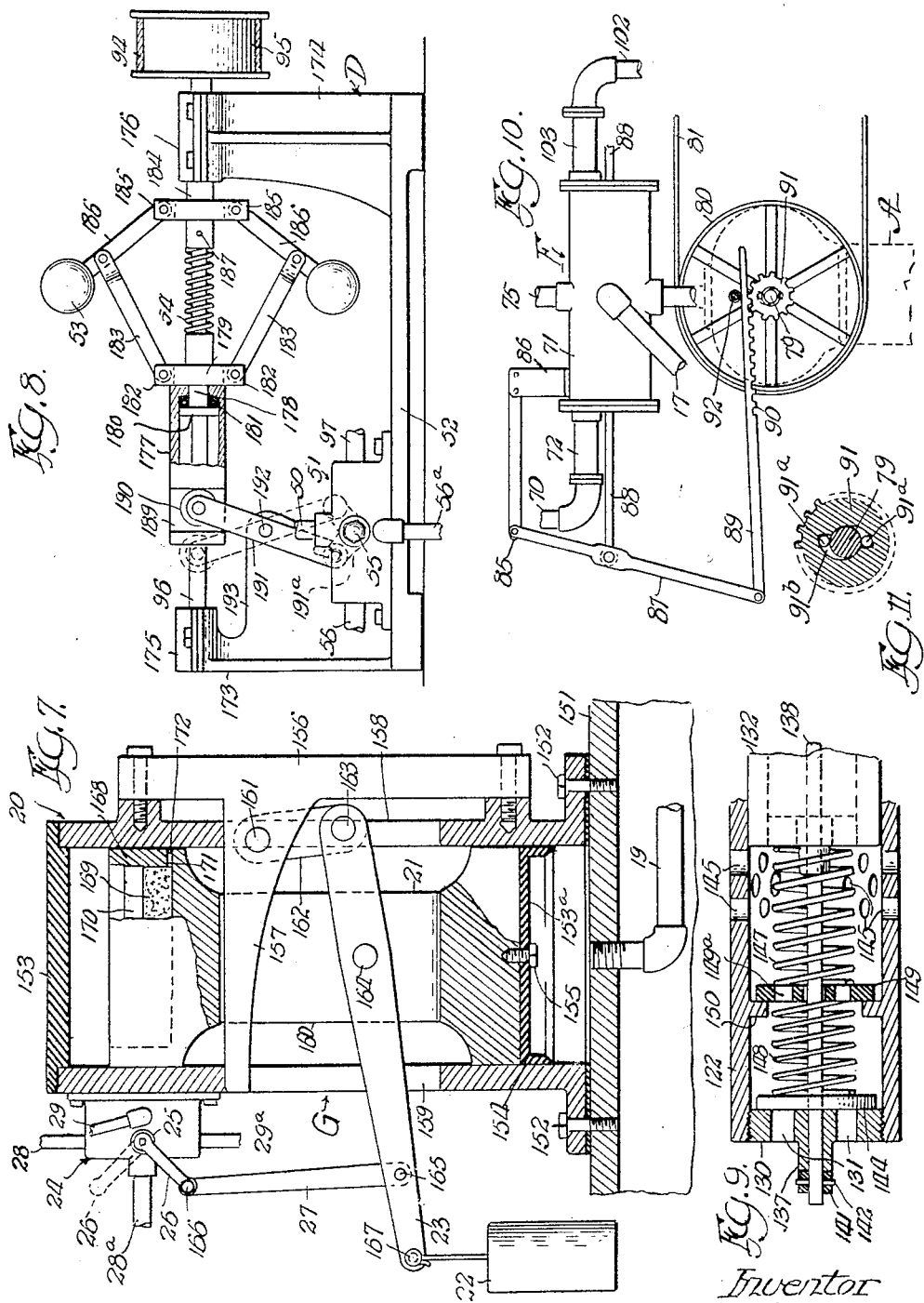

FRED S. VAUGHN, OF QUINCY, ILLINOIS, ASSIGNOR TO AUTOMATIC GAS POWER COMPANY, OF QUINCY, ILLINOIS, A CORPORATION OF SOUTH DAKOTA.

FLUID-PRESSURE SYSTEM.

1,396,482.

Specification of Letters Patent.

Patented Nov. 8, 1921.

Application filed April 17, 1915. Serial No. 21,961.

*To all whom it may concern:*

Be it known that I, FRED S. VAUGHN, a citizen of the United States, and a resident of Quincy, in the county of Adams and State of Illinois, have invented certain new and useful Improvements in Fluid-Pressure Systems; and I do hereby declare that the following is a full, clear, and exact description thereof, reference being had to the accompanying drawings, and to the letters of reference marked thereon, which form a part of this specification.

My invention relates to fluid pressure systems, and more particularly to that type of such systems wherein, as soon as the level of the fluid in the storage drops to a predetermined low level, the generator or pump is automatically started to replenish the supply of fluid to the storage, and, when the fluid reaches its predetermined high level in the storage, the generator or pump is automatically stopped and the fluid supply to the storage cut off.

Heretofore in such type of systems, and especially when the same are installed in water pumping plants and the like, all of the parts of the installation, including the prime mover or motor, pump, and controlling valves, are designed and made of a size and capacity to meet the working conditions of the particular plant in which they are installed. The installation in one plant cannot be duplicated, in so far as size and capacity of the parts are concerned, unless the second plant has the same capacity and works under substantially the same conditions as the previously installed plant. The parts of the installation must be designed and made to meet the working conditions of the particular installation. It has been impossible, heretofore, to manufacture what may be termed a standard equipment, for use in all plants regardless of the capacity of the same or the conditions under which the plants work or are to be operated.

In my prior Patent No. 1,050,876, granted January 21, 1913, I have shown and described a system of the type referred to and wherein an internal combustion engine is employed as the prime mover or motor for operating the fluid pump. In said patent I have also shown and described an element or device for automatically effecting the starting of the internal combustion engine, when the fluid pressure in the storage drops to a predetermined low level, and automatically stopping the engine or motor, when a predetermined high level is reached in the storage.

Among the objects of my present invention is to produce a system wherein an automatic controlling device of the kind referred to in my said prior patent may be effectively and efficiently employed and may be made of a standard size and installed as a part of the equipment of any plant regardless of its capacity or the working conditions thereof.

In carrying out the objects of my present invention, I have designed a system wherein the fluid is stepped from one unit to another in succession, the first step being permitted and controlled by my automatic controlling or governing device. In this way the automatic device may be made of a standard size and installed in any plant regardless of its capacity.

A further object of the present invention is to improve the construction of the system in the several particulars as will hereinafter appear, and to improve in particular the several working parts of the system, so that such parts may be made standard and installed in all plants without having particular reference to the capacity thereof.

The invention consists further in the matters hereinafter described and more particularly pointed out in the appended claims.

In the accompanying drawings—

Figure 1 is a diagrammatic view of a fluid pressure system embodying the features of my invention;

Fig. 2 is an enlarged, longitudinal sectional view of the primer cylinder, showing the relief valves at the ends thereof;

Figs. 3, 4 and 5 are transverse, sectional views on a small scale, taken through the primer cylinder and showing the endwise movable piston valve therein in three of its positions;

Fig. 6 is a transverse sectional view taken on line 6—6 of Fig. 2;

Fig. 7 is a vertical sectional view, with parts in elevation, taken through the balancing cylinder;

Fig 8 is a side elevational view of the automatic governor;

Fig. 9 is a fragmentary longitudinal sectional view of a modified form of relief valve;

Fig. 10 is a view of a supplemental starting device, to be hereinafter referred to in detail; and Fig. 11 is a vertical sectional view of a detail of construction embodied in Fig. 10.

In Fig. 1 of the accompanying drawings I have shown diagrammatically a fluid pressure system embodying the features of my invention, and for the purpose of more clearly understanding the construction and operation of the system I have shown and will hereinafter describe the same as being installed in a water or like plant of that type employed for storing fluid or water in a storage or tank, from which latter the fluid is drawn to be consumed or used.

As illustrated, said system comprises, in its general features, a generator or pump A; a fluid storage or tank B; a prime mover or internal combustion engine C; a control device D; a reversing valve device E; a primer valve device F; and a balancing valve device G. Such parts are so designed, arranged, and connected that, when the fluid in the storage B drops below a predetermined level, the balancing valve device G is set in motion, so as to effect the initial operation of the parts and thus permit the fluid from the storage B to flow into and operate the pump A for starting or cranking said engine C. The control device D is connected with said engine C, and when the latter attains a certain predetermined rate of speed, said control device D effects the reversal of action of the parts E and F, so as to change the flow of fluid from the pump A to the storage B, thus causing the pump to replenish the supply of fluid in the storage. The control device D is so controlled that, when the engine C is at rest or is being turned at a rate of speed less than that referred to, said control device will remain in a condition enabling the fluid to flow from the storage into and operate said pump A for cranking said engine C. In other words, when the engine C attains a certain rate of speed, the control device D acts to effect the reversal of the action of the parts E and F and thus changes the direction of flow of the fluid from the pump to the storage. Whereas, should the speed of the engine C fall below the rate mentioned, the control device D will then operate so as to change the action of the parts E and F and thus cause the fluid to flow from the storage into and operate the pump A. The control device D, therefore, steps the work from E to F, and it follows that such parts may be made of a standard size for all installations, and thus the cost of construction of the installation of the plant is materially reduced. When the fluid in the storage B reaches its predetermined level, the balancing device G is again set in operation, so as to effect the stopping of the engine and thus the pump A.

Referring to the drawings, the storage B is shown to be in the form of a tank or stand-pipe 10, mounted in upright position upon a foundation or base 11. The predetermined high level in the tank 10 may be indicated, for the sake of illustration, by the dotted line 12 in Fig. 1, and the predetermined low level may be denoted by the dotted line 13. The tank 10 is provided with an outlet pipe 14, in which may be placed a controlling valve 15. The outlet pipe 14 may lead to the city mains, in case my system is installed in a water plant of a municipality, or said outlet pipe may be connected with any source of consumption. Said tank 10 is provided with an inlet pipe 16, through which water is pumped into the tank. The generator or fluid pump A is provided with a suction or intake pipe 17, the latter leading to a suitable source of fluid or water supply.

For the sake of illustration, it will be assumed that the water or fluid in the tank 10 stands at its predetermined high level, and that the pump A, the prime mover or engine C, and other working parts of the system are at rest. The valves between the system and the pump A are closed. The valve 15 is open and the outflow of fluid from the tank 10 continues during the period of consumption and until the level of the fluid in the tank drops to its predetermined low level mark. A pipe 18 opens into said tank 10 adjacent its lower end, and said pipe 18 is connected with a pipe 19, the latter opening into the bottom of a balancing cylinder 20. (See Figs. 1 and 7.) When the fluid in the tank 10 stands at its predetermined high level, there is a sufficient pressure or head to hold the piston 21 in the balancing cylinder 20 in its uppermost or raised position, and such pressure is sufficient to overcome the gravity of the weight 22, hung upon the free end of an arm 23 connected with the piston 21. Said arm 23 is so connected with the piston 21 (see Fig. 7) that the arm is moved vertically in the upward and downward endwise movement of said piston 21. As soon as the fluid in the tank 10 reaches its predetermined low level, the pressure of the fluid against the bottom of the piston 21 is relieved, and the weight descends, thereby causing the piston 21 to move downward into the position shown in Fig. 7. Secured to the balancing cylinder 20 is a four-way cock casing 24, in which is mounted a turning plug 25 provided with a handle 26. A link 27 connects said handle 26 with said arm 23, and, when the latter is moved downward by the weight 22, the handle 26 is moved from the position shown in Fig. 1 to the position shown in full lines in Fig. 7. In this movement of the parts, the turning plug 25 is rotated into a position cutting off communication between the pipes 28 and 28ª while establishing communication between said pipe 28 and a pipe 29, and also opening the pipe 28ª into a waste pipe 29ª. (See Fig. 1.) Said pipe 28 is connected with the pipe 18 at one side of an emergency valve 30, which as shown is of the manually operable type. The pipe 29 is connected with a pipe 31, the latter opening into the bottom of a cut-off valve cylinder 32. A branch pipe 33 connects the pipe 31 with the bottom of a cut-off valve cylinder 34. When the turning plug 25 occupies the position shown in full lines in Fig. 7, the water in the tank 10 flows into the bottom of the cut-off valve cylinders 32, 34 through the pipes 18, 28, turning plug 25, and pipes 29, 31, and 33. Under the force of the tank pressure thereby admitted below the pistons 35, 36 in said cylinders, said pistons are raised or moved upward, carrying therewith their piston stems 37, 38, and raising the cut-off valves 39, 40 from their respective seats in the cut-off valve casings 41, 42. Tank pressure previously admitted above said pistons is forced out of the cylinders 32, 34 into the waste pipe 29ª through pipes to be hereinafter referred to. Pivoted to the piston rod 38 is a switch arm 43, the latter being fulcrumed between its ends on a bracket 44. The free end of the switch arm 43 is provided with a contact plate, to which is connected a lead wire 45, and the bracket 44 is provided with a coöperating contact plate 46 connected with a lead wire 47. Said lead wires 45, 47 are connected with a battery or the like (not shown) and the spark plug of the engine. In the upward movement of the cut-off valve stem 38, the free end of the switch arm 43 is moved downward and into engagement with the contact 46, thereby closing the circuit of the sparking system.

When the cut-off valve 40 is opened by the upward movement of the piston 36, water from the tank 10 flows into the pipes 48, 49, and 50. The latter opens into a four-way cock casing 51 mounted on the base 52 of the governor device D. (See Figs. 1 and 8.) The balls 53, 53 of said governor device D are held at zero by suitable means, preferably in the form of a spring 54 as shown in Fig. 8. When said balls are in zero position, the turning plug 55 of the four-way cock 51 is in a position establishing communication between the pipe 50 and a pipe 56, thereby permitting tank pressure to flow from the tank into a pipe 57, the latter opening into the bottom of the cylinder 58 of the reversing valve unit E. Under the action of the tank pressure thus admitted below the piston 59 in said cylinder 58, said piston is moved endwise upward, carrying therewith its piston rod 60. Tank pressure previously admitted into said cylinder 58 above the piston 59 is forced into the waste pipe 56ª through pipes to be presently referred to.

In Fig. 1, the several parts of my system are shown in their relative proportions, and it will be noted that the controlling device D is much smaller in size than the reversing valve unit E and the other parts of the system. It will also be noted that the said device D in its operation permits tank pressure to flow directly from the tank 10 into the larger reversing valve unit E. Said controlling device D, therefore, steps the tank pressure into said reversing valve member E.

As illustrated in Fig. 1, a rod 61 is pivoted at one end by a pin 62 to the base 63 of the engine C. The other end of the rod 61 is so connected with said piston rod 60 that the free end of the rod 61 is raised and lowered in the upward and downward movement of the piston 59. Said rod 61 is connected with the piston rod 60 in the following manner: Secured to the piston rod 60 is a transverse plate 64, upon the upper surface of which bears an antifriction roller 65 mounted on the free end of the rod 61. The exhaust valve stem 66 of the engine C is connected with said rod 61, and, when the piston 59 is moved upward by tank pressure admitted below the same, the rod 61 is moved upward, carrying therewith the exhaust valve stem 66, thereby opening the exhaust valve and killing the compression of the engine. Under these conditions, the engine may be easily started or turned. After the piston 59 is moved upward a sufficient distance, suitable transverse passages therein (not shown) are brought into registration with pipes 67 and 68. The pipe 67 is connected with the tank 10 through the pipes 48 and 49, and, the cut-off valve 40 being open, tank pressure flows from the tank through the pipe 67, piston 59, and into the pipe 68. The latter is connected with the pipes 69, 70. Said pipe 70 opens into one end of the cylinder 71 of the priming unit F through a relief valve 72, and, when the parts are in the position stated, tank pressure from the tank 10 flows directly into the left-hand end of the cylinder 71 and serves to move endwise the piston 73 therein in a direction away from the relief valve 72. In such endwise movement of the piston 73 suitable passages in said piston, to be hereinafter referred to, are brought into registration with pipes 74 and 75. The pipe 74 opens into the tank 10 through the cut-off valve casing 41 and main inlet pipe 16, and, said cut-off valve 39 being open, tank pressure flows directly from the tank 10 into the pipes 74 and 75 through the passage in the piston 73. Said pipe 75 connects with pipes 76 and 77, and between the latter two is placed a check valve 78. Said pipe 77 opens into the suction side of the pump A, and the check valve 78 prevents a back flow of fluid into the pipe 76. When the parts are in the position stated, tank pressure flows from the tank 10 into the pump A through pipes 16, 74, 75, 76, 77, and check valve 78, thereby priming the pump and rotating the rotor therein. The fluid flows out of the pump A through a pipe 84 connected, through a passage in the piston 73, with the intake pipe 17. The rotor in the pump A is mounted on the pump shaft 79. (See Fig. 10.) A belt pulley 80 is also mounted on said pump shaft, and a belt 81 connects said pulley with a pulley or flywheel 82 mounted on the crank shaft 83 of the engine C. The pump A, being operated by the flow of fluid therethrough during priming, turns the pulleys 80 and 82, and the latter in its rotation turns the engine C. It will be noted that the reversing valve unit E is smaller in proportions than the priming unit F. It will also be noted that the reversing unit E in its operation effects the operation of the primer F. In other words, the reversing valve E steps tank pressure to the primer F, the automatic device D being the initial starting element of such parts. Said automatic device D is smaller in proportions than either the reversing valve E or the primer F, and by reason of the fact that the automatic device controls the operation of the other two parts by stepping the tank pressure from one to the other in succession, the automatic device may be made of a standard size and installed in any plant regardless of its working capacity. The flow of fluid from the tank 10 through the pump A continues until the pump starts the engine C, and when the latter attains a suitable speed, the action of the several working parts of the system is reversed by the controlling device D and the pump A operated to pump fluid into the tank 10. This cycle of operations of the parts will be presently described.

The pump A is of that type wherein the direction of rotation of the rotor during priming is the same as during actual pumping, and, consequently, the rotation of the rotor during priming effects the turning or starting of the engine C. To give the pump A increased power in the initial starting of the engine C a device of the following construction may be employed: As shown in Fig. 10, an arm 85 is secured at one end to a bracket 86 mounted on the primer cylinder 71. To the free end of said arm 85 is secured a lever 87, the latter being connected between its ends with the piston rod 88 of the primer cylinder piston 73. A rack bar 89 is connected with the lower end of the lever 87, and said rack bar is provided with rack teeth 90, adapted in the endwise movement of the rack bar to mesh with the teeth of a gear pinion 91 mounted on the pump shaft 79. When the primer piston 73 is moved endwise toward the left by tank pressure, the piston rod 88 is moved in the same direction and serves to move the rack bar 89 out of mesh with the pinion 91. Said rack bar is held against the pinion by a guide roller 92 mounted on the pump casing above the rack bar and opposite the pinion 91. As the rack bar is moved endwise toward the right, the teeth of the latter are moved into mesh with the teeth of the gear pinion 91, and continued movement of the rack bar in the direction noted serves to rotate said gear pinion 91. The latter is connected with the pump shaft 79 by a clutch device shown in Figs. 10 and 11. As illustrated, the rollers 91$^a$ are in recesses 91$^b$ in the gear pinion and engage the shaft 79 so that when the pinion is rotated toward the right, the rollers clutch the pinion to the shaft, and when rotated in the reverse direction, the gear pinion is unclutched from the shaft. It follows that, when the rack bar is moved toward the right by the piston 73, the pump shaft 79 is rotated, and cranking of the engine C during the priming of the pump A is assisted. In said Fig. 10 I have shown the rack bar 89 in mesh with the pinion 91, it being assumed that the rack bar is being moved toward the right. When the piston 73 is in its pumping position, to be hereinafter referred to, the rack bar 89 has been moved into a position out of mesh with said gear pinion 91.

Mounted on the engine crank shaft 83 is a pulley 93 connected by a belt 94 with a pulley 95 on the shaft 96 of the automatic device D. (See Figs. 1 and 8.) As the engine C is being turned by the pump A during priming, the shaft 96 of the automatic device D is rotated and effects the throwing outward or spreading apart of the governor balls 53, 53. In the outward movement of such parts, the turning plug 55 of the four-way cock 51 is rotated into a position cutting off communication between the pipes 50 and 56, while establishing communication between said pipe 50 and a pipe 97. The latter is connected with pipes 98 and 99, and said pipe 99 opens into the top of the cylinder 58 of the reversing valve unit E. When the turning plug 55 is moved into the position stated, the cut-off valve 42 is still open, and tank pressure flows into the upper end of the cylinder 58 through the pipes 48, 49, 50, 97, 98, and 99. Under the action of the tank pressure admitted above the piston 59, the latter is moved downward, and the lever 61 is permitted to fall or drop by gravity, thereby closing the exhaust valve of the engine C and permitting the same to have full compression. As the sparking circuit is closed and the engine is turned by the pump, the engine C soon starts under its own power. When the piston 59 reaches its lower limit of downward movement, the pipe 67 is cut off from communication with the pipe 68, but a suitable passage in said piston establishes communication between the pipe 68 and a waste pipe 100. Another passage in said piston 59 opens the pipe 67 into a pipe 101. The pipe 68 being opened into the pipe 100, fluid previously admitted into the left-hand end of the primer cylinder 71 is permitted to flow therefrom into the waste pipe 100, the path of the fluid being through the relief valve 72 and pipes 70, 69, 68, piston 59, and into said waste pipe 100. On the other hand, the pipe 67 opening into pipe 101, tank pressure from the tank 10 flows into the right-hand end of the primer cylinder 71 through the pipes 101, 102, and relief valve 103. Said relief valve 103 is similar in construction and operation to the relief valve 72 at the opposite end of the primer cylinder 71. Tank pressure being admitted into the right-hand end of the primer cylinder 71 acts to move the piston 73 toward the left, forcing the fluid in the opposite end of the cylinder 71 into the waste pipe 100. It is, of course, understood that the cut-off valves 39 and 40 are still held open. When the piston 73 reaches the limit of its movement toward the left, communication between the pipes 74 and 75 is cut off, while communication between the intake pipe 17 and the pipe 75 is established. Another passage in the piston 73 establishes communication between the pipes 84 and 74. By this time the engine C is running under its own power, and the pump A is operating as such, drawing fluid or water from the source through the intake pipe 17, pipes 75, 76, and 77 through the check valve 78. The fluid is forced by the pump A into the tank 10 through the discharge pipe 84, pipe 74, open valve 39, and main inlet pipe 16.

The operation of the pump A, as such, continues to force fluid into the tank 10 until the level of the same therein reaches the predetermined high level 12, and certain parts of the system are then operated to stop the pump and its connected motor C in the manner to be presently described.

During the downward movement of the piston 59 in the reversing valve member E the turning plug 55 of the automatic device D occupies a position establishing communication between the pipe 56 and a waste pipe 56ª, so that the fluid previously admitted below the piston 59 will flow to waste.

The pipe 19 being in open communication with the tank 10 through the pipe 18 at one end and in open communication with the balancing cylinder 20 at the lower end, the lower end of the balancing cylinder 20 is always in open communication with the tank 10, and, when the fluid reaches its predetermined high level in the tank 10, the pressure or head thereof is sufficient to overcome the gravity of the weight 22, and the fluid flowing into the bottom of the balancing cylinder 20 acts to raise the piston 21 therein upward, effecting a like movement of the weight 22. The link 27 is also moved upward and acts to turn the handle 26 of the turning plug 25 into the position shown in dotted lines in Fig. 7. The turning plug 25 is, therefore, moved into a position cutting off communication between the pipes 28 and 29 and establishing communication between the pipes 28 and 28ª. Communication is also established between the pipe 29 and a waste pipe 29ª, thereby permitting the fluid below the cut-off valve pistons 35, 36 to be discharged from the bottoms of the cylinders 32, 34 into the waste pipe 29ª. At the same time tank pressure from the tank 10 flows into the upper ends of the cut-off valve cylinders 32, 34 through the pipes 104, 105, 106, all of which are in communication with the pipe 28ª. Under the action of the tank pressure admitted into the upper ends of the cylinders 32, 34, the pistons 35, 36, which have been previously moved upward, are moved downward, thereby closing the cut-off valves 39, 40 and stopping the flow of fluid to the parts A, C, E, and F. During the downward movement of the cut-off valve piston 36 the switch arm 43 is moved out of contact with the contact plate 46, thereby breaking the sparking circuit and stopping the engine C. Consequently, the pump A is stopped, and no more fluid is forced into the tank B. The parts remain inoperative until the level of the fluid in the tank 10 drops to its predetermined low level, and the cycle of operations above described is repeated to start the operation of the system.

An advantage arising from the use of my system resides in the fact that the automatic governor device may be made of a standard size and used in any plant regardless of the size of the installation. I have shown and described a system wherein two steps are utilized, but it is of course to be understood that the governor automatic device of a standard size may be used in a system requiring one step or may be used in a system requiring two or more steps. The governor device D, whether used in a system employing one step or a system employing two or more steps, will be the same in size in either installation. The cost of the installation is greatly reduced, because the equipment may be made standard, and, further, power required to operate the installation is brought down to the minimum, as the automatic device D is operated with the expenditure of a very little power. The engine C, therefore, need have only the prerequisite power to operate the pump A. It follows, therefore, that the cost of the installation is further reduced to the minimum, as the engine is required to expend very little power to operate the controlling unit of the system.

Referring to the construction of the primer cylinder 71, I have shown the same in detail in Fig. 2, and in Figs. 3, 8, and 5 I have shown cross-sectional views indicating the three main positions of the primer piston 73 in its endwise movement in both directions. As illustrated, said cylinder 71 is arranged in a horizontal position, but it is, of course, to be understood that the cylinder may be arranged in any other position desired, depending upon the conditions of the plant in which the cylinder is used as a unit thereof. Said cylinder 71 is provided at its ends with cylinder heads 107, 108. The relief valve 72 is secured to the cylinder head 107; and the relief valve 103 is secured to the cylinder head 108. Said piston 73 is provided with piston rods 88, 88 one at each end thereof, which piston rods extend through the adjacent cylinder heads 107, 108. As shown in Figs. 3, 4, and 5, the cylinder 71 is provided intermediate its ends with a plurality of ports 109, 110, 111, 112, spaced circumferentially at equal distances apart and all arranged in the same plane with each other. The piston 73 is provided between its ends with four transverse passages 113, 114, and 115, 116, the first two constituting one pair and being in the same plane with each other. The second two passages 115, 116 constitute the second pair and are arranged in the same plane with each other, but, as shown in Fig. 2, the planes in which the respective pairs of passages are located are spaced apart from each other. When the pump A is being primed and the engine C started, the piston 73 is in the position shown in Fig. 5 with its passage 113 registering with the cylinder ports 109, 110 and establishing communication with the pipes 74, 75, respectively. The other passage 114 registers with the cylinder ports 111, 112 and establishes communication between the pipes 84 and 17, respectively. The other piston passages 115, 116 are at this time closed by the walls of the cylinder 71 and are out of registration with the cylinder ports referred to. When the piston 73 is in the position shown in Fig. 5, tank pressure flows from the tank 10 through the pump A to prime and turn the same, and, when the pump A is pumping fluid into the storage tank 10, the piston 73 has been moved toward the left and occupies the position shown in Fig. 4. In such position the first set of piston passages 113, 114 have been moved out of registration with the cylinder ports, and said passages are closed by the walls of the cylinder 71. However, the second set of piston passages 115, 116 register with the cylinder ports 110, 111, and 109, 112, respectively, and communication is established between the pipes 84 and 74 and the pipes 17 and 75 respectively. When the parts are in the position shown in Fig. 8, the pump A is acting as such, and fluid or water is drawn from the source and forced into the storage tank 10 in the manner hereinbefore described. In Fig. 3 the piston 73 is shown in the position it occupies when moving between the positions shown in Fig. 4 and Fig. 5, and in the position shown in Fig. 3 all of the cylinder ports are closed by the wall of the piston 73 and the piston passages are closed by the walls of the cylinder 71. The reversing cylinder 58 and its piston 59 are constructed similar to and operate in the same manner as the primer cylinder 71. It will, of course, be understood that relief valves may be employed on the reversing valve cylinder 58 if the same should be desired.

For the purpose of preventing the primer valve piston 73 from turning or rotating during its endwise movement and maintaining said piston in proper position so that its passages will always properly register with the cylinder ports, I provide the following construction: As shown in Figs. 2 and 6, a guide member, in the form of a rod 117, is located within the cylinder 71, and said rod is secured to the cylinder head 107 and extends into the cylinder 71 longitudinally thereof. The piston 73 is provided with a recess or channel 118 opening outwardly through one end of said piston and arranged to receive the rod 117. Said rod and channel are substantially the same in diameter, so that there is no transverse lost motion between the rod and the piston 73. The channel 118 is closed at its inner end and is deep enough to allow the piston 73 to move toward the cylinder head 107 to the limit of its endwise movement in that direction without causing the end of the rod 117 to come into contact with the end wall of the channel 118. In order to prevent a head of water from forming between the end wall of the channel 118 and the end of the rod 117, so as to permit free movement of the piston toward the cylinder head 107, a portion of the cylindric surface of the rod is flattened throughout the length thereof in the form of a face 119. Said face 119 gives the rod the cross-sectional form shown in Fig. 6 and provides a channel between the rod and the circular wall of the channel 118, which channel provides communication between the channel 118 and the space within the cylinder 71. As the piston 73 moves endwise toward the cylinder head 107, the fluid in the channel 118 is forced therefrom into the cylinder 71 through the channel just described, and the open end of the channel 118 is flared outwardly so that the channel referred to will always be in open communication with the cylinder no matter how close the piston 73 approaches the cylinder head 107. As illustrated, the rod 117 is provided with a reduced outer end portion 120, which extends through and beyond the cylinder head 107. Such portion 120 is screw-threaded to receive a clamp nut 121, by means of which the rod is secured to the cylinder head 107.

It is desirable that the piston 73 move from priming into pumping position as rapidly as possible in order to effect a quick change of the ports and permit a large volume of fluid to flow into the pump A without delay. Yet it is necessary to prevent the piston 73 from moving beyond its priming or pumping position and also prevent the same from coming to a quick stop as it reaches either one of the positions stated. Should the movement of the piston 73 be suddenly stopped when it reaches either one of the two positions stated, the jar on the parts of the apparatus would be of such a nature as likely to damage the same. To prevent such jars the relief valves are employed, and in Fig. 2 I have shown in detail the construction of the relief valve 72. The piston 73 in moving endwise from priming into pumping position moves against a volume of fluid in the left-hand end of the cylinder 71. Said cylinder during such movement of the piston 73 is in open communication with the atmosphere through the waste pipe 100. The endwise movement of the piston 73 toward the left continues until the piston passages 115, 116 partially register with the cylinder ports 110, 111 and 109, 112, respectively. In order to prevent the piston 73 from being stopped suddenly as soon as the passages 115, 116 fully register with the cylinder ports referred to, the relief valve 72 operates in the following manner: Said relief valve, as shown in Fig. 2, comprises an open ended cylinder in the form of a sleeve 122, which is located exterior to the primer cylinder 71 and is secured to the cylinder head 107 thereof. Said sleeve 122 is surrounded by a hollow tubular casing 123 secured to the cylinder head 107 by clamp screws or the like 124 inserted into the cylinder head through an annular flange 125 on the casing 123. The casing 123 and pipe 70 are secured together by clamp bolts 126 inserted through abutting annular flanges 127, 128, as shown in said Fig. 2. The sleeve 122 extends into an opening provided therefor in the cylinder head 107, and said sleeve is provided with an external annular flange 129 bearing against the outer face of the cylinder head 107. The sleeve 122 extends through a bore provided in the casing 123, and the casing is provided with an annular recess adapted to receive the annular flange 129 on said sleeve. The casing 123 supports the sleeve 122 in position with its inner end opening into the cylinder 71. The outer end of the sleeve 122 opens into the casing 123 in line with the pipe 70, and said sleeve is provided in such end with a spider 130 having ports 131, 131 therein. Located in said sleeve 122 is a valve member in the form of a hollow piston 132, which fits within the sleeve and is adapted to have endwise sliding movement therein. The length of the piston 132 is less than the length of the sleeve 122, and said piston is provided at the ends thereof with spiders 133, 134 which are provided with outwardly projecting bosses 135, 136. The spider 130 is provided with an outwardly projecting boss 137, and a guide stem 138 extends lengthwise of the sleeve 122 through said bosses 135, 136, 137. To prevent said stem from moving endwise relatively to the hollow piston 132, a collar 139 is secured thereto, exterior to the boss 136, by a cotter pin or other suitable means 140. A collar 141 is secured to the stem exterior to the boss 137 by a pin 142. The collar 141, by contact with the boss 137, limits the movement of the hollow piston 132 and the stem 138 toward the cylinder 71, and the collar 139, by contact with the boss 136, limits the movement of the hollow piston 132 on the stem 138 in the same direction. Located within the sleeve 122 and between the spider 130 and the opposed end of the hollow piston 132 is a spring 143, which encircles that portion of the stem 138 extending between such parts. One end of said spring 143 bears against a disk 144 loosely mounted on the stem 138. Said disk 144 is of a diameter sufficient to close the ports 131, 131 in the spider 130 when the disk is held against said spider by the spring 143. The other end of the spring 143 bears against the adjacent end of the hollow piston 132. Said spring 143 normally tends to expand and serves to maintain the disk 144 against the spider 130 closing the ports therein and the hollow piston 132 in the position shown in Fig. 2. In such position, the ports 145, 145, provided in the cylindric wall of the sleeve 122, are uncovered. Said ports 145, 145 open into the annular space between the cylindric wall of the sleeve 122 and the like wall of the casing 123. The spider 134 in the inner end of the hollow piston 132 is provided with a plurality of ports 146, 146, which open into the cylinder 71. When the parts are in the position shown in Fig. 2, the fluid or tank pressure flows from the pipe 70 into the sleeve 122 through the ports 145, 145 and into the cylinder 71 through the hollow piston 132 and the end ports 146, 146 thereof. The spring 143 is weak enough to permit the disk 144 to be moved out of contact with the spider 130 by the tank pressure, thereby uncovering the ports 131, 131 in the outer end of the sleeve 122 and permitting tank pressure to flow into the sleeve through said ports 131, 131. The flow of fluid in the direction stated takes place in the endwise movement of the primer cylinder piston 73 in a direction to prime the pump. (See Fig. 5.) When said piston 73 is moved in the opposite direction to bring the parts in the position shown in Fig. 4, and in which position the pump A is operating as such, the fluid in the left-hand end of the cylinder 71 is forced by the piston 73 in its return movement from the cylinder 71 through the said relief valve 72. The discharge of fluid is through the hollow piston 132 and into the casing 123 through the ports 145. The outflow of fluid through the sleeve 122 acts to force the valve disk 144 against the spider 130, thereby closing the ports 131, 131 in the outer end of said sleeve. This diminishes the flow of fluid into the sleeve 123 and serves in a degree to retard the movement of the piston toward the cylinder head 107, but, in order to further throttle the piston 73 and effect a gradual stopping of the same so that the passages 115, 116 will not be moved beyond registration with the cylinder ports heretofore referred to, the stem 138 is made long enough so as to extend a sufficient distance into the cylinder 71 beyond the inner end of the hollow piston 132. Just before the piston 73 reaches the position shown in Fig. 4, the piston comes into contact with the inner end of the stem 138 and moves the stem and the hollow piston 132 toward the outer end of the sleeve 122. As said piston 132 is moved in the direction stated, the same gradually closes the ports 145, 145, thereby restricting the outflow of fluid through such ports and retarding the travel of the piston 73 toward the cylinder head 107. The hollow piston 132 is moved by the piston 73 until the ports 145, 145 are fully closed, and at such time the piston 73 has moved into its position shown in Fig. 4. By stopping the outflow of fluid through the relief valve a sufficient head is maintained in the left-hand end of the cylinder 71 to prevent further movement of the piston 73. The movement of the hollow piston 132 to close the ports 145, 145 is against the expansive action of the spring 143, and the valve disk 144 is maintained in contact with the spider 130, closing the ports 131, 131 therein and preventing the outflow of fluid through the same. When the tank pressure in the right-hand or opposite end of the cylinder 71 is opened to the atmosphere in the manner heretofore described, tank pressure flows into the left-hand end of the cylinder 71 through the relief valve 72, the incoming pressure acting to move the valve disk 144 away from the spider 130 and uncovering the ports 131, 131 therein, thereby allowing the tank pressure to flow into the sleeve 122 and move the hollow piston 132 into position uncovering the ports 145, 145, whereupon the inflow of fluid takes place in the manner above described. The spring 143 at this time expands and acts to assist the movement of the hollow piston 132 into the position stated and as shown in Fig. 2.

The relief valve 103 at the opposite end of the cylinder 71 is constructed exactly like the one described and shown in Fig. 2 and operates in the same manner, upon the piston 73 moving from pumping into priming position.

In Fig. 9 I have shown a slight change in the construction of the relief valve 72, and, as shown in said Fig. 9, two springs 147, 148 are employed in place of one spring as shown in Fig. 2. The spring 147 has one end bearing against the hollow piston 132 and its opposite end bearing against a spider or disk 149 loosely mounted on the stem 138. Said disk 149 is provided with ports 149$^a$ so as to permit the incoming fluid to flow therethrough. The spring 148 is interposed between the disk 149 and the valve disk 144, and said spring is weaker than the spring 147 but possesses a sufficient expansive power to normally maintain the valve disk 144 in closed position. The disk 149 is held normally in contact with a plurality of inwardly projecting lugs 150, 150 integral with the sleeve 122, and said disk 149 is normally maintained by the spring 147 against said lugs.

In Fig. 7 I have shown in detail the balancing cylinder 20, hereinbefore referred to, and as shown said cylinder is arranged in upright position on a suitable base 151. The cylinder is secured to the said base by means of machine screws or the like 152, 152. The upper end of the cylinder 20 is closed by a dust cap or head 153, and the base 151 closes the lower end of the cylinder. Located in the cylinder 20 is the piston 21 hereinbefore mentioned, and as shown said piston is adapted to have vertical movement in said cylinder 20. As illustrated said piston 21 has secured to its bottom face an inverted leather packing cup 153$^a$, the latter being clamped to the piston by means of an annular disk 154 through which is inserted a cap screw 155. The pipe 19 opens into the bottom of the cylinder 20 through the base 151 thereof. To one side of the cylinder 20 is secured a bracket 156, which is provided with a laterally projecting arm 157, the latter projecting across the cylinder through vertical slots 158, 159 formed in the walls thereof. The piston 21 is also provided between its ends with a vertical slot 160 in alinement with the slots 158, 159, and through which the arm 157 extends. Said arm 157 has upward bearing against the upper ends of the slots 158, 159 so as to overcome the tendency of the arm to be moved upward during the action of the device. Pivoted to the arm 157 by a pivot pin 161 is a link 162. The inner end of the movable arm 23, heretofore referred to, is pivotally secured by a pivot pin 163 to the lower end of the swinging link 162. Said arm 23 projects outward through the vertical slots 158, 159, and 160, and is pivotally secured by a pivot pin 164 to the piston 21 intermediate the upper and lower heads thereof. The link 27 is connected at its lower end by means of a pivot pin 165 with the arm 23 and at its upper end by a pin 166 with the handle 26 of the turning plug 25 of the four-way cock 24. Although I have shown a weight 22 as a means for normally holding the free or outer end of the arm 23 in the lower limit of its downward movement, I may, of course, employ any other form of construction for accomplishing this purpose, and I do not wish to be limited to the use of the weight as shown. The weight 22, however, is removably secured to the outer end of the arm 23, and any means for accomplishing this purpose may be employed. The upper end of the piston 21 is made hollow so as to form an oil chamber. Said hollow head is indicated by 168 and serves to guide the piston 21 in its endwise movement. Placed in the hollow head 168 is a felt or like disk 169 adapted to contain suitable lubricant by absorption. Placed upon the disk is a follower plate 170 of such weight that the same serves to express the oil contained in the felt disk therefrom. Oil ports 171 are provided in the hollow head 168 so as to allow oil in the oil chamber to flow therefrom into an outer, circumferential oil groove 172. After the parts 169 and 170 are placed in the oil chamber, the latter is filled with oil or other suitable lubricant.

In Fig. 8 I have shown in detail the governor device D. As illustrated, upright standards 173, 174 are provided on the base 52, and the upper ends of said standards are provided with suitable bearings 175, 176, in which is journaled the shaft 96. Slidably mounted on said shaft is a sleeve 177, into which projects the boss 178 on a collar 179, the latter being loosely mounted on the shaft. Said boss is provided, within the sleeve 177, with an annular flange 180 adapted to form with the adjacent inturned end of the sleeve 177 a race-way for anti-friction bearing balls 181, 181. Said collar 179 is provided, exterior to the sleeve 177, with radial arms 182, to which are pivoted links 183. Fixed to the shaft 96 is another collar 184 provided with arms 185, 185, to which are pivoted arms 186, 186, upon the outer ends of which are mounted the governor balls 53, 53. The collar 184 is fixed to the shaft 96 by a set screw or pin 187. The sleeve 177 is provided with a vertically arranged, laterally opening groove or channel 189, in which is located a roller 190 carried at the upper end of a rocking lever 191. Said lever 191 is fulcrumed by a pivot pin 192 to a transverse web 193 made integral with the standard 173. The lower end of said rocking arm 191 is pivotally connected with the handle 191ª of the turning plug 55. When the shaft is at rest, the spring 54 moves the sleeve 177 endwise toward the standard 173 and maintains the governor balls 53, 53 in zero position. When in such position, the rocking lever 191 is in the position shown in dotted lines in Fig. 8, and the turning plug 55 (having been turned upon the rocking of the lever 191 into the position stated) establishes communication between the pipes 50 and 56, so that fluid or tank pressure may flow into the bottom of the reversing valve cylinder 58 when the cut-off valve 42 is opened. When the shaft 96 is turned by the engine C, the governor balls 53, 53 are spread apart in the position shown in Fig. 8, and the sleeve 177 has been drawn endwise of the shaft 96 toward the standard 174, thereby rocking the lever 191 into the position shown in full lines in Fig. 8, with the result that the turning plug 55 has been turned and occupies the position establishing communication between the pipes 50 and 97, thereby allowing tank pressure to flow into the top of the reversing valve cylinder 58. Communication between the pipes 50 and 56 has been cut off, while the pipes 56 and 56ª are opened into each other so that the fluid in the bottom of the reversing valve cylinder 58 may flow to the atmosphere through pipe 56ª when the piston 59 in said cylinder 58 is being moved downward by the tank pressure above the same.

The system herein described and shown is automatic in its operation. The generator or pump and its connected prime mover are automatically started when the level of the fluid in the storage drops to a predetermined low level so that the generator will replenish the supply of fluid in the storage and automatically stop the generator and its connected prime mover as soon as the liquid in the storage reaches a predetermined high level in said storage. With my system it is possible to use an internal combustion engine, the engine being cranked automatically without the assistance of an attendant. The governor device and its various, directly connected parts may be made standard and installed in systems as a standard unit without reference to the capacity or size of the installation. This materially reduces the cost of installation and economizes the cost of construction and the power to operate the system.

While I have shown and described in detail herein a system of the character referred to, it is, of course, to be understood that I do not wish to be limited to the exact details of construction of the various parts of my system and the exact arrangement of such parts, as the details of construction and arrangement of the parts may be variously changed and modified without departing from the spirit and scope of my invention, and I do not wish to be limited to the exact arrangement shown in the accompanying drawings and described herein, except in so far as pointed out in the appended claims.

I claim as my invention:

1. The combination in a system of the character described, a fluid storage, a motor, a pump, a fluid operated means including a balancing device, a reversing valve device and a primer valve device, all being connected with the storage so that when the fluid in the latter drops below a predetermined level the fluid will flow from said storage into and operate said pump for starting said motor, and a control device operated by said motor and adapted when the latter attains a certain speed to effect the reversal of said fluid operated means so as to permit the fluid to flow from said pump into said storage.

2. The combination in a system of the character described, a fluid storage, a motor, a pump, fluid operated means including balancing, reversing, and primer valve devices, adapted when the fluid in the storage drops below a predetermined level to permit fluid to flow from the storage into and operate said pump for starting said motor, and a control device connected with said motor and adapted when operated thereby to reverse the action of the reversing and primer valve devices, in the order named, for changing the flow of fluid from the pump to the storage.

3. The combination in a system of the character described, a fluid storage, a prime mover, a pump connected with said prime mover and adapted to supply fluid to said storage, a priming cylinder and a reversing valve cylinder, both having communication with said storage and with each other, said priming cylinder having communication with said pump, a piston in each of said cylinders, means adapted, when the fluid in said storage drops below a predetermined level, to permit the fluid to flow from said storage into said reversing valve cylinder and operate the piston therein, so as to establish communication between the storage and said priming cylinder and thereby permit fluid to flow from said storage into said priming cylinder and move the piston therein in a direction to allow fluid to flow from said storage and operate said pump for starting the prime mover, said means acting, when the prime mover operates under its own power, to reverse the flow of fluid from said storage into said cylinders and move the pistons therein in a direction to allow the pump when operated by said prime mover to supply fluid to said storage, and means adapted, when the fluid in said storage reaches said predetermined level, to effect the stopping of said prime mover.

4. The combination in a system of the character described, a fluid storage, a prime mover, a pump connected with said prime mover and adapted to supply fluid to said storage, fluid operated means having communication with said storage, a valve for opening or closing the communication between the storage and said fluid operated means, means adapted, when the fluid in the storage drops below a predetermined level, to open said valve, and means adapted, when said valve is open, to permit fluid to flow from said storage into and operate said fluid operated means, so as to allow fluid to flow from said storage into and operate said pump for starting said prime mover, said last mentioned means being connected with said prime mover and adapted, when the latter operates under its own power, to reverse the flow of fluid to said fluid operated means, so as to permit said pump when operated by said prime mover to supply fluid to said storage, and said first mentioned means effecting the closing of said valve, when the fluid in said tank reaches said predetermined level.

5. The combination in a system of the character described, a fluid storage, a prime mover, a pump connected with said prime mover and adapted to supply fluid to said storage, a priming member and a reversing member, both having communication with said storage, valves for opening and closing the communication between said storage and each of said members, a balancing cylinder in communication with said storage and adapted, when the fluid in said storage drops below a predetermined level, to open said valves, and means connected with said prime mover and adapted, when said valves are open, to permit the fluid to flow from said storage into said priming member through said reversing member and operate the former, for allowing fluid to flow from said storage into and operate said pump for starting said prime mover, and, when said prime mover operates under its own power, to reverse the flow of fluid to said members and allow said pump when operated by said prime mover to supply fluid to said storage, and said first mentioned means being adapted, when the fluid in the storage reaches said predetermined level, to effect the closing of said valves and the stopping of said prime mover.

6. The combination in a system of the character described, a fluid storage, means for supplying fluid to said storage, fluid operated means for controlling the supply of fluid thereto, a cylinder in open communication with said storage, a piston located in said cylinder and adapted to be moved in one direction by the pressure of the fluid in said storage, mechanical means for moving said piston in the opposite direction, a valve adapted to be moved into either of two positions, one permitting fluid to flow from the storage into and operate said fluid operated means, for closing the communication between said storage and said fluid supplying means, and the other position permitting fluid to flow from said storage into and reverse the operation of said fluid operated means for opening the communication between said storage and said fluid supplying means, and means connecting said valve with said piston, so that said valve will be moved into one of said two positions in the movement of said piston in one direction and into the other of said two positions when the piston is moved in the opposite direction.

7. The combination in a system of the character described, a fluid storage, means for supplying fluid to said storage, a valve for controlling the supply of fluid thereto, fluid operated means for operating said valve, a cylinder in open communication with said storage, a piston located in said cylinder and adapted to be moved in one direction by the pressure of the fluid in the storage, a turning plug adapted to be moved into either of two positions, one permitting fluid to flow from the storage into and operate said fluid operated means, for closing said valve, and the other position permitting fluid to flow from said storage into and reverse the operation of said fluid operated means, for opening said valve, mechanical means for moving said piston in the opposite direction, and means connecting said turning plug with said piston, so that said turning plug will be moved into one of said two positions in the movement of said piston in one direction and into the other of said two positions in the movement of the piston in the opposite direction.

8. The combination in a system of the character described, a fluid storage, means for supplying fluid to said storage, a valve for controlling the supply of fluid thereto, fluid operated means for operating said valve, a cylinder in open communication with said storage, a piston located in said cylinder and adapted to be moved in one direction by the pressure of the fluid in said storage, a turning plug adapted to be moved into either of two positions, one permitting fluid to flow from said storage into and operate said fluid operated means, for closing said valve, and the other position permitting fluid to flow from said storage into and reverse the operation of said fluid operated means, for opening said valve, a weighted member connected with said piston and adapted to effect the movement of said piston in the opposite direction, and means connecting said piston with said turning plug, so that the latter will be moved into one of said two positions in the movement of said piston in one direction and into the other of said two positions in the movement of said piston in the opposite direction.

9. The combination in a system of the character described, a fluid storage, means for supplying fluid to said storage, a valve for controlling the supply of fluid to said storage, including an endwise movable member, a cylinder in open communication with said storage, a piston located in said cylinder and adapted to be moved in one direction by the pressure of the fluid in said storage, a turning plug adapted to be moved into either of two positions, one permitting fluid in the storage to act against one end of said endwise movable member to close said valve, and the other of said positions permitting fluid in the storage to act against the other end of said endwise movable member to open said valve, a weighted member for moving said piston in the opposite direction, and a link connecting said piston with said turning plug, so that the latter will be moved into one of said two positions in the movement of said piston in one direction and into the other of said two positions in the movement of said piston in the opposite direction.

10. The combination in a system of the character described, a fluid storage, means for supplying fluid to said storage, means for controlling the supply of fluid thereto, comprising a valve, a valve cylinder, a piston therein and connected with said valve, a balancing cylinder in open communication with said storage, a piston located in said balancing cylinder and adapted to be moved in one direction by the pressure of the fluid in said storage, pipes connecting said storage with the opposite ends of said valve cylinder, a waste pipe, a turning plug adapted to be turned into either of two positions, one establishing communication between the storage and one end of said valve cylinder, for permitting fluid to flow from said storage into said cylinder and move the piston therein in a direction to close said valve, and the other position permitting fluid to flow from the storage into the other end of said valve cylinder, for moving the piston therein in a direction to open said valve, an arm pivotally connected with said piston, a weighted member secured to said arm for moving said piston in the opposite direction, and a link connecting said arm with said turning plug, so that the latter will be moved into one of said two positions in the movement of said piston in one direction and into the other of said two positions in the movement of said piston in the opposite direction.

11. A balancing mechanism, comprising a cylinder, a piston located therein, said cylinder and said piston being provided between their ends with registering longitudinal slots, a bracket secured to said cylinder, an arm extending through said slots and pivotally secured between its ends to said piston, a link pivotally connecting said arm with said bracket, a valve casing mounted on said cylinder, a turning plug therein, a handle secured to said turning plug, a member connecting said handle with said arm, and a weighted member secured to the free end of said arm.

12. The combination in a system of the character described, a fluid storage, a pump for supplying fluid to said storage, a motor connected with said pump, a cylinder interposed between said storage and said pump, a piston located in said cylinder and adapted when moved into one position to permit fluid from said storage to flow into said pump, so as to move the same and start said prime mover, and when moved into the other position to permit the pump to supply fluid to said storage, fluid operated means for effecting the endwise movement of said piston, means for admitting fluid from said storage into and for operating said fluid operated means, and a relief valve at each end of said cylinder for retarding the endwise movement of said piston, and each relief valve forming a fluid passage between said cylinder and said fluid operated means.

13. The combination in a system of the character described, a fluid storage, means for supplying fluid to said storage, a cylinder in communication with said storage and with said fluid supplying means, an endwise movable piston located in said cylinder and adapted when moved in one direction to permit fluid to flow from said storage into and operate said fluid supplying means, for starting the same, and when moved in the opposite direction to permit said fluid supplying means to supply fluid to said storage, a relief valve at one end of said cylinder and comprising a sleeve having ports therein, and a member adapted to be moved endwise in said sleeve for opening and closing said ports, said member being moved endwise to close said ports by said piston, and means for effecting the endwise movement of said piston.

14. The combination with a cylinder, of a casing secured to one end of said cylinder, a sleeve within said casing and opening into said cylinder, said sleeve being provided intermediate its ends with ports, a hollow piston slidably mounted in said sleeve and adapted in its endwise movement to open and close said ports, means for moving said hollow piston in a direction to open said ports, and a piston located in said cylinder and adapted in its movement in one direction to effect the movement of said hollow piston, so as to close said ports.

15. In combination, a cylinder, of a piston located therein, a hollow casing secured to one end of said cylinder, a sleeve within said casing and opening into said cylinder, said sleeve being provided intermediate its ends with ports, a hollow piston slidably mounted in said sleeve and adapted in its endwise movement to open and close said ports, a stem connected with said hollow piston and having one end thereof extending into said cylinder, said piston in its endwise movement in said cylinder toward said sleeve being adapted to contact with said stem and move the same in a direction to close said ports, and yieldable means serving to move said hollow piston in the opposite direction, when said piston moves away from said stem.

16. A relief valve, comprising a sleeve provided intermediate its ends with a plurality of circumferentially spaced ports, a disk for normally closing one end of said sleeve, a hollow piston slidably mounted in said sleeve and adapted in its endwise movement to open and close said ports, a spring interposed between said disk and said hollow piston and normally maintaining said disk in a position closing one end of said sleeve and said hollow piston in a position uncovering said ports, and a stem upon which said disk and hollow piston are mounted.

17. The combination in a system of the character described, of a fluid storage, a pump adapted to supply fluid to said storage, a motor connected with and adapted to operate said pump, a cylinder in communication with said storage and said pump, a piston located in said cylinder and adapted when moved endwise in one direction to permit fluid to flow from said storage into and operate said pump for starting said motor, and when moved endwise in the opposite direction to permit said pump when operated by said motor to supply fluid to said storage, means adapted to be operated by the fluid in said storage to effect the endwise movement of said piston in both directions, and mechanical means actuated by said piston and operating on said pump, for increasing the power of the latter when operated for starting said motor.

18. The combination in a system of the character described, a fluid storage, a pump for supplying fluid to said storage, an engine connected with and for operating said pump, said pump having a shaft, a cylinder in communication with said storage and said pump, a piston located in said cylinder and adapted when moved endwise in one direction to permit fluid to flow from said storage into and operate said pump for starting said engine, and when moved in the opposite direction to permit said pump when operated by said engine to supply fluid to said storage, means for effecting the operation of said piston, and means for increasing the power of said pump when operated to start said engine, embracing a lever pivotally secured to said cylinder and connected with said piston, a gear wheel connected with said pump shaft and adapted when turned in one direction to be connected with said shaft and when turned in the opposite direction to become disconnected from said shaft, and a rack bar connected with the swinging end of said lever and adapted to mesh with said gear wheel.

19. The combination in a fluid pressure system, a fluid storage, a pump for supplying fluid to said storage, a prime mover for operating said pump, fluid operated means in communication with said storage and said pump, means for effecting the operation of said fluid operated means, comprising a shaft connected with and adapted to be rotated by said prime mover, a valve casing, a turning plug therein adapted to occupy either of two positions, one establishing communication between the storage and said fluid operated means, for effecting the movement thereof in a direction to permit fluid to flow from said storage into and operate said pump, for starting said prime mover, and the other position establishing communication between the storage and said fluid operated means, for effecting the operation thereof in the opposite direction, for permitting said pump when operated by said prime mover to supply fluid to said storage, a member mounted on said shaft, an arm connecting said member with said turning plug, the latter being moved alternately into said two positions in the endwise movement of said member, centrifugal means adapted, when said shaft is rotated by said prime mover, to effect the movement of said member in one direction, and means adapted, when the fluid in said storage reaches a predetermined level, to stop the flow of fluid to said fluid operated means and effect the stopping of said prime mover.

20. The combination, in a system of the character described, of a fluid storage, a motor, a pump, and means, including fluid-operated balancing, reversing, and primer valve devices and a control device operated by said motor, acting, when the fluid in the storage drops below a predetermined low level, to permit the fluid to flow from the storage into and operate the pump for starting the motor, and to reverse the flow of fluid through the pump upon the operation of the latter by the motor, and to effect the stopping of the motor when the fluid in the storage reaches a predetermined high level, and automatically to effect a repetition of this operation whenever the fluid in the storage drops below said predetermined level.

In testimony, that I claim the foregoing as my invention I affix my signature in the presence of two witnesses, this tenth day of April A. D. 1915.

FRED S. VAUGHN.

Witnesses:
   DAVID LONG,
   L. M. DEPENBROCK.